(12) United States Patent
Negoi

(10) Patent No.: US 7,257,009 B2
(45) Date of Patent: Aug. 14, 2007

(54) VOLTAGE CONVERTER FOR CONVERTING AN INPUT VOLTAGE TO AN OUTPUT VOLTAGE AND DRIVING CIRCUIT COMPRISING A VOLTAGE CONVERTER

(75) Inventor: Andy C. Negoi, Adliswil (CH)

(73) Assignee: NXP B.V., Eindhoven (NL)

( * ) Notice: Subject to any disclaimer, the term of this patent is extended or adjusted under 35 U.S.C. 154(b) by 294 days.

(21) Appl. No.: 10/511,479

(22) PCT Filed: Apr. 14, 2002

(86) PCT No.: PCT/IB03/01369

§ 371 (c)(1),
(2), (4) Date: Oct. 15, 2004

(87) PCT Pub. No.: WO03/090332

PCT Pub. Date: Oct. 30, 2003

(65) Prior Publication Data

US 2005/0254271 A1    Nov. 17, 2005

(30) Foreign Application Priority Data

Apr. 19, 2002    (EP)    .................. 02008829

(51) Int. Cl.
*H02M 3/18*    (2006.01)
(52) U.S. Cl. ....................................... 363/59
(58) Field of Classification Search .................. 363/59, 363/60; 327/534, 536, 537
See application file for complete search history.

(56) References Cited

U.S. PATENT DOCUMENTS 6,693,483 B2 *    2/2004    Deml et al. .................. 327/536
6,801,077 B2 *    10/2004    Negoi .......................... 327/536

* cited by examiner

*Primary Examiner*—Jessica Han

(57) ABSTRACT

The invention regards an improved voltage converter with increased current capability. The voltage converter architecture may be configured by software. In the prior art programmable charge pumps have been configured in such a way, that the unused stages were simply short circuited by a decoding logic. According to the invention these stages are used to increase the current capability of the first pumping stage. In particular the result is an increase in current capability of a proposed charge pump device by 10% to 15% without the need of additional parts and within the same area.

18 Claims, 5 Drawing Sheets

Figure 1:
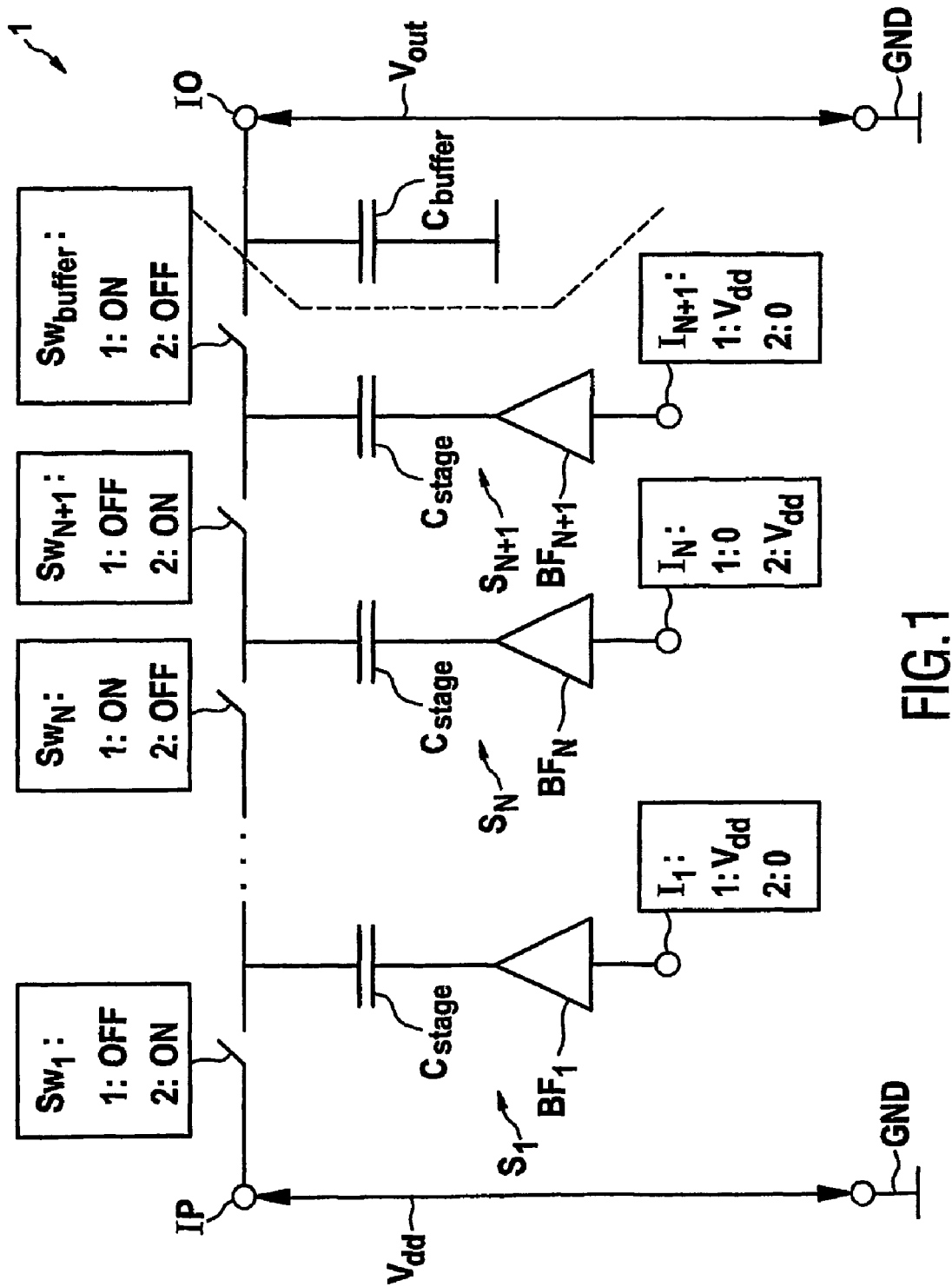

VOLTAGE CONVERTER FOR CONVERTING AN INPUT VOLTAGE TO AN OUTPUT VOLTAGE AND DRIVING CIRCUIT COMPRISING A VOLTAGE CONVERTER

The invention regards a voltage converter for converting an input voltage to an output voltage comprising a plurality of cascaded voltage multipliers and control circuitry for controlling the plurality of voltage multipliers. Further, the invention leads to a driving circuit comprising such a voltage converter.

A voltage converter, such as a charge pump device or other device comprising voltage multipliers, is used to generate a higher voltage than a supply voltage available for an application. A voltage converter may have several voltage multipliers arranged in stages in a kind of cascade. A charge storage element of the first stage may be charged upon a switching event of a driver driving the first stage. A further switching element of the first stage may be in an opened position in this case. Thereafter the further switching element may be closed so that the charge may be supplied to the next stage. The charge storage element of the subsequent stage may then be charged upon a switching event of a driver driving the subsequent stage. Thus, a charge stored in the first stage is forwarded to one or more subsequent stages, where it is added to the charge of such a subsequent stage, so that a higher voltage is generated and can be provided to a device of an application.

An advantage of using charge pumps is that generally no additional bypass switches are needed and a voltage converter of such kind can thus be relatively simply construed. A charge pump may be composed of a cascade of several stages, whereby each stage contains at least one switch or diode, a charge-storing element, usually realized as a capacitor, and a driver. The driver commands the charge storing elements and may be operated by periodical signals or phases.

A voltage converter is known from a publication in the IEEE Journal of solid-state circuits, vol. SC-11, No. 3, June 1976, pages 374-378. In the publication the voltage converter output voltage serves to provide a high supply voltage in a NMOS integrated circuit application. Further, a voltage converter may be used in a liquid crystal display (LCD) driver as an application to generate a bias voltage required by a driving scheme. Yet another application is the generation of a high voltage necessary to write a flash memory.

Basic architectures of voltage converters employed in LCD-driving IC's may be programmable with regard to the application to which the voltage is supplied. Such a voltage converter as that mentioned in the introduction allows an appropriate number of selected voltage multipliers to be activated, i.e., if a relatively low output voltage is desired, the number of active voltage multipliers is relatively low, whereas if a relatively high output voltage is desired, the number of active voltage multipliers is relatively high. Thus, an unnecessarily high number of active voltage multipliers can be avoided, thereby avoiding a low power efficiency of the voltage converter. The non-active, i.e. disabled voltage multipliers should be bypassed by means of switches or shunted parallel to an active voltage multiplier. Some types of voltage multiplier allow a switch within the voltage multiplier to be used, in order to bypass the respective voltage multiplier if it is in a non-active operating mode.

LCD modules find a large application in cellular phones and other hand-held tools such as organizers, laptops, PDAs etc. An available supply voltage for an analogue block may be 2.8 V and an LCD graphic display may be driven with voltages of 6 V to 16 V and should also be operable within a large range of supply voltages. A range of output voltages is desired for different kinds of applications.

However, in the LCD driving integrated circuits (IC's) the trend nowadays is towards developing ever increasing resolutions and color displays, in particular for mobile terminals such as phones, PDA's etc. These displays need a large current at a voltage approaching 20 V, which has to be generated by the LCD-driving IC. In the actual LCD-driving IC's the amount of charging capability of a charge storage element, particularly a capacitor value, is limited and the amount of necessary currents is increasing. The achievable voltage and required current are subject to compromise, but still the need for an increased current capability is generally becoming more acute. In particular, an increasingly large current is usually drawn from a smaller capacitor and the voltage drop due to a charge transfer is increasingly large. This large voltage drop may be multiplied by all the stages of a voltage converter, thus degrading the performance.

This is where the invention comes in, the object of which is to propose an apparatus and a method of converting an input voltage to an output voltage, whereby an improved current capability should be achieved.

As regards the apparatus the object is solved by a voltage converter according to claim 1, which claims a voltage converter for converting an input voltage to an output voltage comprising a plurality of cascaded voltage multipliers and control circuitry for controlling the plurality of voltage multipliers, wherein in accordance with the invention the control circuitry comprises a switching means for activating at least one first voltage multiplier selected from the plurality of voltage multipliers and for switching at least one further voltage multiplier located in the cascade before the first voltage multiplier in the same way as the first voltage multiplier.

Further, as regards the apparatus the object is solved by a driving circuit according to claim 14, which is a driving circuit, comprising a voltage converter at present, in particular a driving circuit for a display device.

As regards the method the object is solved by a method of converting an input voltage to an output voltage by means of a voltage converter comprising a plurality of cascaded voltage multipliers, wherein in accordance with the invention at least one first voltage multiplier selected from the plurality of voltage multipliers is activated and at least one further voltage multiplier located in the cascade before the first voltage multiplier is switched in the same way as the first voltage multiplier.

The proposed invention has arisen from the desire to further increase the current capability of a voltage converter or a driving circuit, in particular when not all stages of a voltage converter are used for multiplying a voltage. The invention has realized that conventionally the unused multipliers and/or charge storage elements of a multiplier merely play a passive role. They merely appear as decoupling or buffering elements. According to the inventive idea now these are used to increase the strength of a first voltage multiplier selected from the plurality of voltage multipliers, when switched as proposed by a switching means. In particular when using a charge pump as a voltage multiplier, if not all stages of the charge pump are used for a pumping charge, the unused capacitors no longer play a passive role in decoupling or buffering capacitors, but are used to increase the strength of the first pumping stage together with their bottom plate driver.

As a main advantage of the invention the first and further voltage multiplier may be switched in the same way by changing the logic circuitry only. Advantageously no increase in area or number of analogue parts is foreseen. Depending on the number of stages and the supply voltage an increase in current capability of 10% to 15% may thus be achieved.

Further, developed configurations of the invention are outlined in the dependent claims.

Switching comprises activating and disabling. To activate the respective stage is preferably switched to the supply voltage $V_{dd}$ potential. The multiplier is thus in an active mode. To disable the respective stage may be switched to ground voltage. The multiplier is thus in a passive mode.

Advantageously the first voltage multiplier is one of a number of activated voltage multipliers also located in the cascade at a second or higher order stage at most, in particular located in a sequence of stages at the end of the cascade.

Advantageously the further voltage multiplier is one of a number of further voltage multipliers also located at the first or higher order stages of the cascade, in particular located in a sequence of stages at the beginning of the cascade.

At least one of a plurality of voltage multipliers is preferably formed by a charge pump.

Such a voltage pump comprises a charge storage element, in particular a capacitor, a switch, in particular a MOSFET switch, and a driver, in particular a bottom plate driver. The charge storage element may be on-chip or off-chip.

Also, one or more of the voltage multipliers may have at least one clock input. The control circuitry is preferably connected to a clock input for supplying a clock signal to a voltage multiplier for controlling the voltage multiplier.

In a preferred configuration the voltage converter is programmable. In particular the switching means is a programmable logic device. Such a logic device is advantageously driven by a programming means for operating the switching means as a function of the output and/or input voltage, i.e. depending on the application. Thus, the multiplication factor of a voltage converter is advantageously adapted to the actual application. In particular, not all stages of the converter may be used to generate an output voltage below the maximal possible voltage, when all stages of the converter are to be used.

In particular, the programming means comprises a software code section capable of activating one or more first voltage multipliers in the case of an input voltage, which is insufficient for the actual application, i.e. the respective multipliers are held in an active operating mode. Further, the programming means may comprise a software code section for disabling a number of voltage multipliers selected from the plurality of voltage multipliers in the case of an input voltage sufficient for the actual application, i.e. the respective multipliers are held in a disabled or passive operating mode. In particular for this specific situation the programming means preferably comprises a software code section capable of selecting one or more further voltage multipliers from the disabled voltage multipliers to be switched in the same way as the first voltage multiplier.

Advantageously a re-configurable voltage converter constitutes one of the above measures or a combination thereof.

A voltage converter and/or a driving circuit as proposed works advantageously under a current load of 0.1 mA to 10 mA.

Preferred embodiments of the invention will now be described in a detailed description with reference to the accompanying drawings. These are meant to show examples to clarify the proposed concept in connection with the detailed description of the preferred embodiment and in comparison to prior art. While the considered preferred embodiment will be illustrated and described, it should of course be understood that various modifications and changes in form or detail could readily be made without departing from the spirit of the invention. It is therefore intended that the invention may not be limited to the exact form and detail shown and described herein nor to anything less than the whole of the invention disclosed herein and as claimed hereinafter. Further the features described in the description, the drawings and the claims disclosing the invention may be essential for the invention, considered alone or in combination.

Figure 2A:
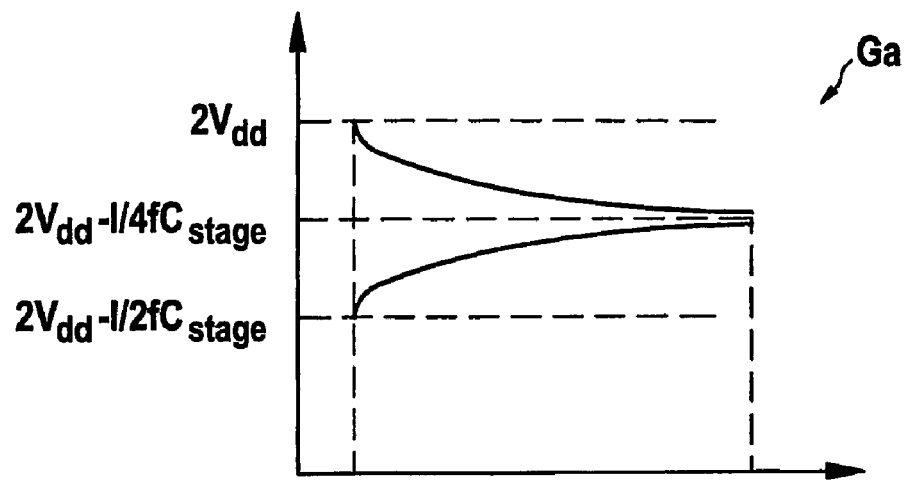
Figure 2A:
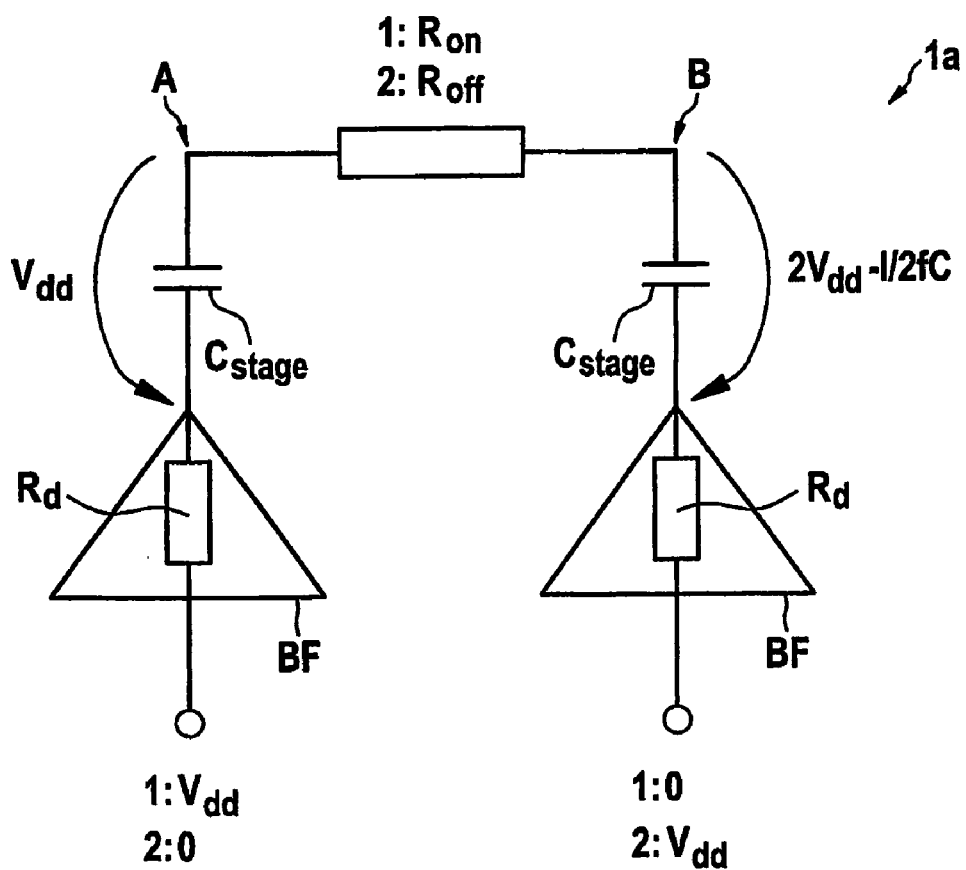
Figure 2B:
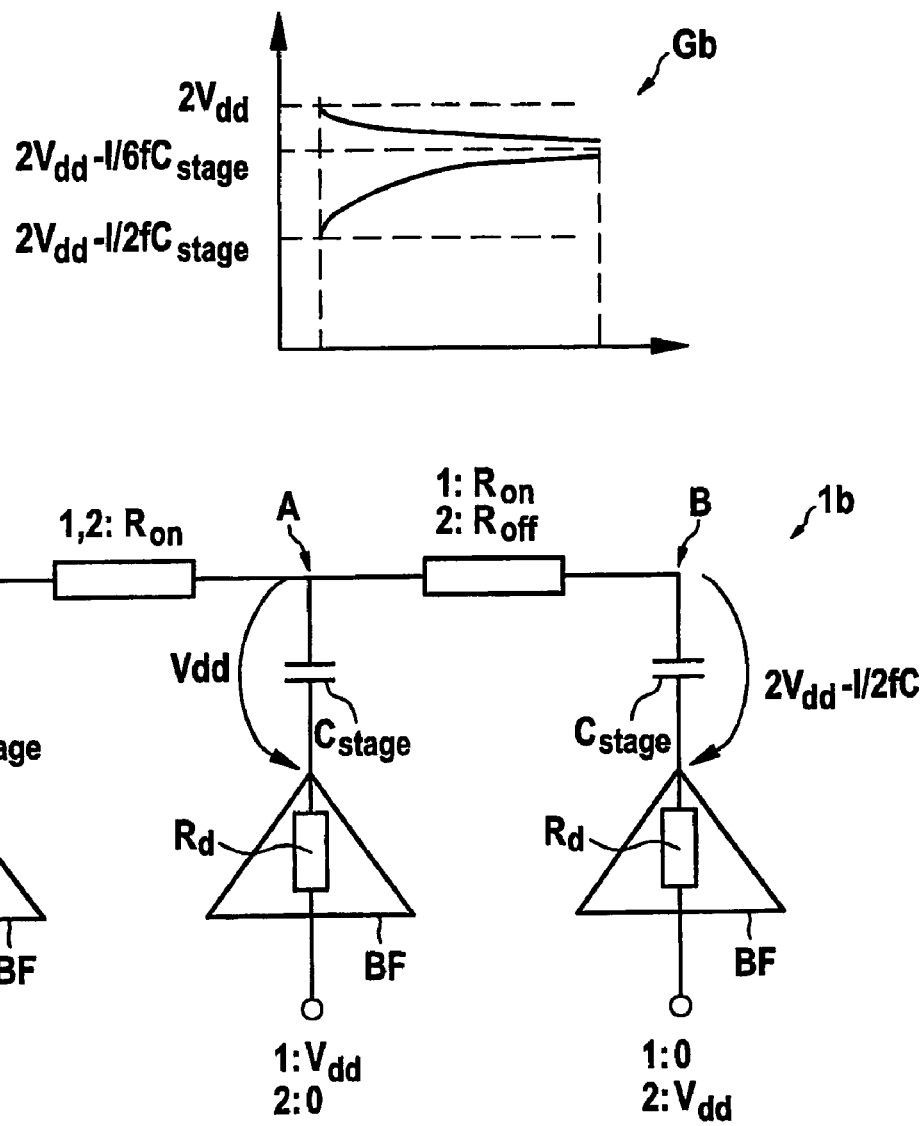
Figure 2C:
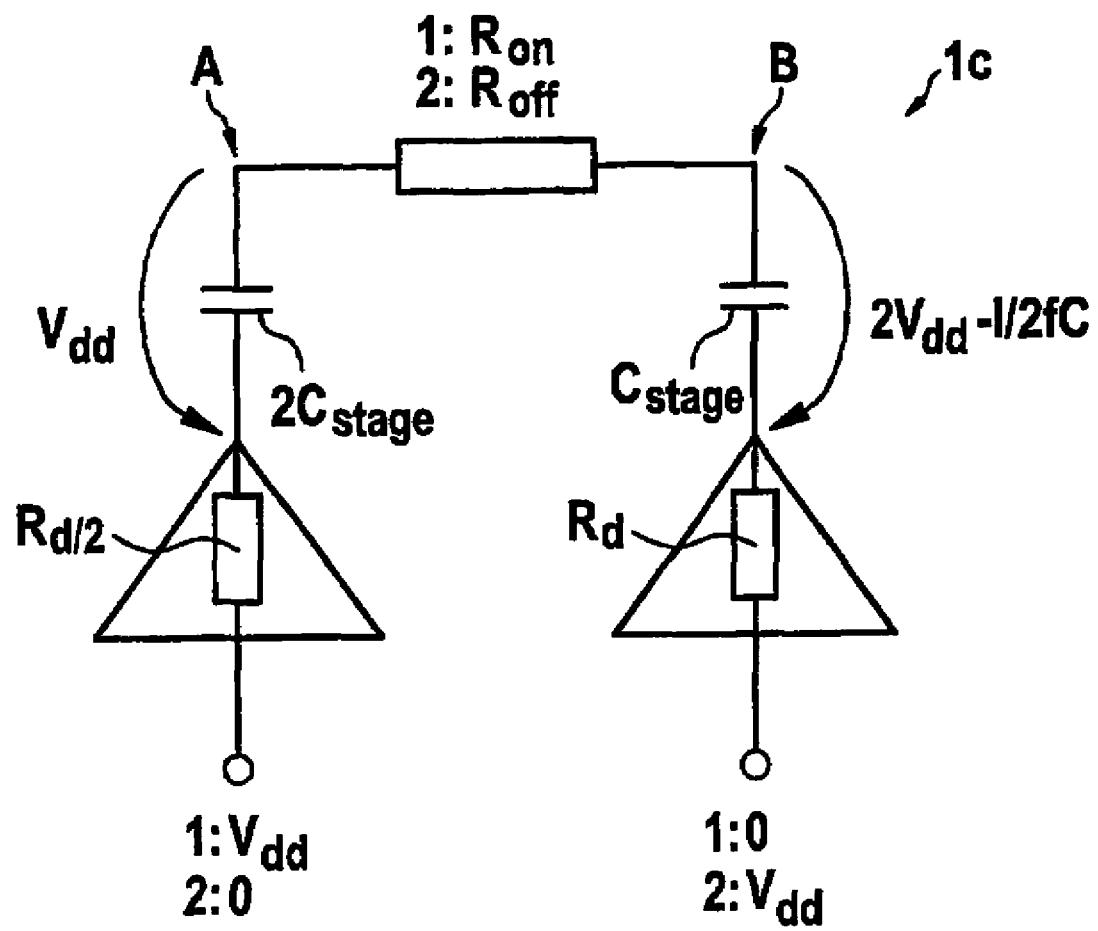
Figure 3:
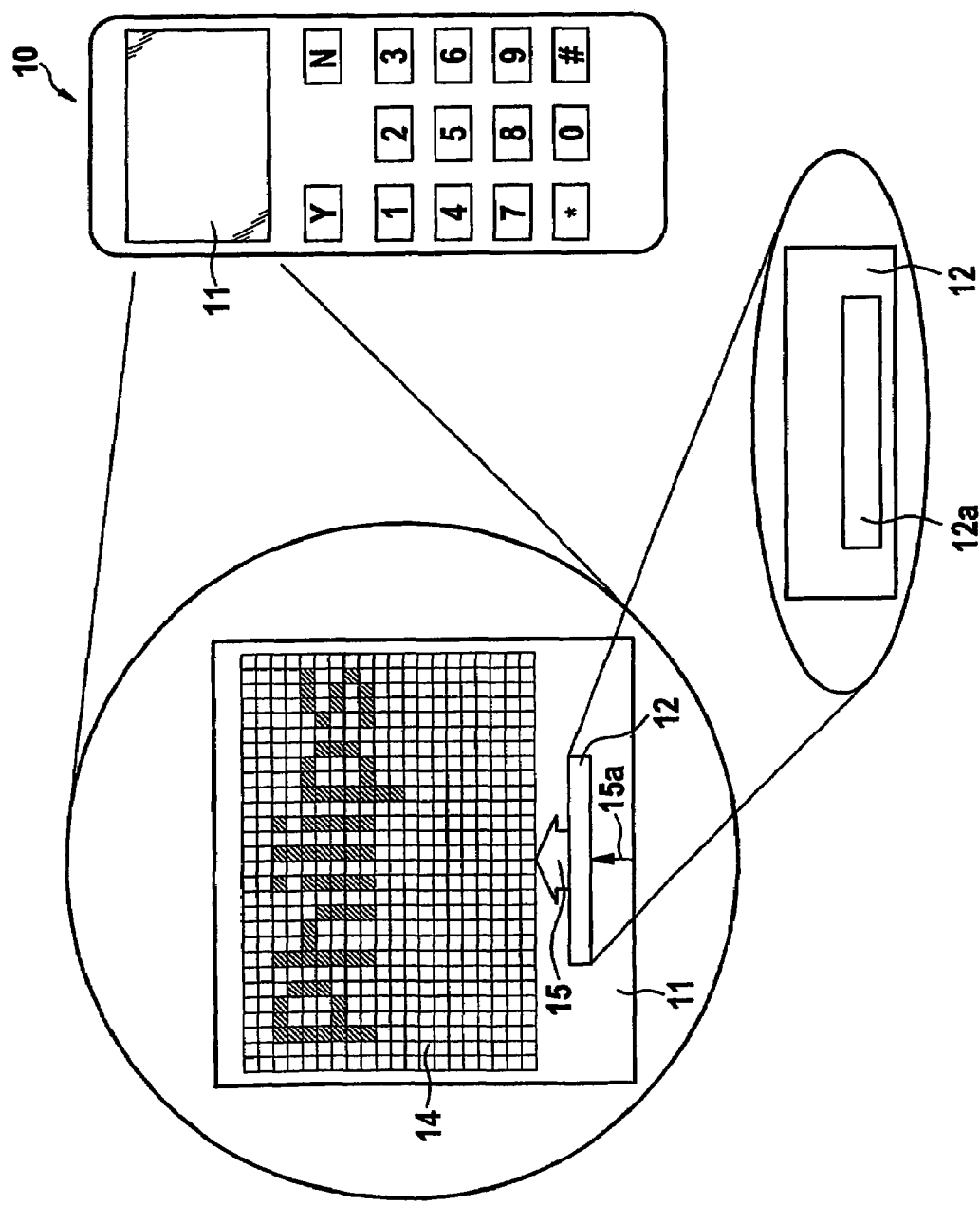

The drawing shows in:

FIG. 1: a schematic charge pump architecture;

FIG. 2a: a schematic view of a prior art charge pump-switching scheme;

FIG. 2b: a charge pump-switching scheme according to the preferred embodiment;

FIG. 2c: an equivalent circuit of the proposed embodiment of FIG. 2b;

FIG. 3: a preferred display device embodiment comprising a driving circuit containing a preferred charge pump.

The preferred voltage converter embodiment is described with regard to a programmable charge pump as shown in FIG. 1. A programmable charge pump 1 has a series of stages $S_1 \ldots S_N, S_{N+1} \ldots S_{max}$ each containing a capacitor $C_{stage}$ as a charge storage element, a MOSFET as a switch $Sw_1 \ldots Sw_N, Sw_{N+1} \ldots S_{max}$ and a bottom plate driver as a switching means (not shown). Each respective charge pumps $S_1 \ldots S_N, S_{N+1} \ldots S_{max}$ further comprises a buffer $BF_1 \ldots BF_N, BF_{N+1} \ldots BF_{max}$ with an input $I_1 \ldots I_N, I_{N+1} \ldots I_{max}$, e.g. for receiving a clock input signal and a voltage $V_{dd}$ as indicated in the Figure. An input voltage $V_{dd}$ is generated by a voltage source between the input terminal IP and the ground terminal GND and is supplied to the charge pump device 1. The stages are connected in a cascade, one after each other. With every stage one input supply voltage $V_{dd}$ may be gained. This is true for the ideal situation of no output current. The clock may also be generated adaptively with several phases. The above-outlined ideal situation has to be corrected as there are internal losses, these losses being mainly due to dissipated currents by switch resistances when in an "on"-position and one or more bottom plate drivers. A single or a plurality of bottom plate drivers are capable of actuating each of the charge pumps $S_1 \ldots S_N, S_{N+1} \ldots S_{max}$ and in particular the switches $Sw_1 \ldots Sw_N, Sw_{N+1} \ldots Sw_{max}$. A driver is operable when connected to each of the charge pumps $S_1 \ldots S_N, S_{N+1} \ldots S_{max}$ in a suitable way, e.g. by operating the input terminals IP, $I_1 \ldots I_N, I_{N+1} \ldots I_{max}$ and the switches $Sw_1 \ldots Sw_N, Sw_{N+1} \ldots Sw_{max}$. A state in which a charge pump may be operated is indicated in FIGS. "1" and "2" respectively. In the output stage with a capacitor $C_{buffer}$ the output voltage $V_{out}$ is generated between the output terminal IO and the ground terminal GND.

The stages $S_1 \ldots S_N, S_{N+1} \ldots Sw_{max}$ of FIG. 1 and the sizing thereof are identical to each other in their construction. However, this is not the optimal case and has been chosen only to achieve a simple design with the advantage of a short design time. Further developed voltage converter embodiments may preferably be designed in a different way. In particular, stages $S_1, S_2 \ldots S_N$ close to the voltage booster input may have a stronger layout than $S_N, S_{N+1} \ldots S_{max}$ closer to the output.

The improvement of the preferred charge pump embodiment with regard to conventional charge pumps is explained in the following.

In a single clock cycle the charge is usually transferred from the capacitor of a stage N into the capacitor of the following stage N+1. At the beginning of the clock cycle, the capacitor of the stage N+1 is not discharged completely. In fact, not all of its charge Q acquired in the preceding cycle is usually transferred to the next stage N+2 within one cycle. In general, the quantity $Q=I_{load}/2f$ is transferred, where f is the clock frequency. This corresponds to a voltage difference of $\Delta U=Q/C=I/2fC$. If the capacitor has a large capacitance C for the same $I_{load}$ the voltage drop $\Delta U$ due to this current is smaller than with a capacitor of small capacitance, which can be drawn from the latter formula. However, in the actual LCD-driving IC's the capacitor value is limited and therefore the amount of currents is becoming increasingly large. Usually a current is in the order of 1 mA and higher. Such a voltage drop has to be assumed for each stage 1 ... N. Therefore, the assumption of an efficiency of 100% $I_{load}=I_{supply}/N$ also holds. As a result the voltage and current achieved are subject to compromises, which have to be made for each application.

As the first stage of the charge pump experiences the following stages as a load, this means that the need of a big current capability becomes more and more acute when approaching the beginning stage $S_1$ of the chain of stages $S_1 \ldots S_N, S_{N+1} \ldots S_{max}$. In particular, if a large current is drawn from a small capacitor $C_{stage}$, then the voltage drop $\Delta U$ due to the charge transfer is large as well. As outlined, this charge voltage drop is multiplied by the following stages N−1 times, thus degrading the performance of a conventional charge pump, as an example of a conventional voltage converter.

To remove such a problem the multiplication factor is programmed as outlined in the following:

Assuming $V_{out}=N_{max}*V_{dd}$ one may choose to generate only $V_{out}=N*V_{dd}$ by setting the $(N_{max}-N)$ switches Sw to the conducting state and, correspondingly, the bottom plate drivers permanently to ground GND. In this case the first active charge pump A of FIG. 2a is not the first charge pump in the cascade, but may be any charge pump in the cascade, e.g. in stage $S_{N+1}$. This means that the respective charge pumps located before the active one are disabled, as is indicated in FIG. 1 by "0". Thus $(N_{max}-N)$ stages are disabled. Within the function of the whole device the disabled stages usually merely play a filtering element role for the input supply voltage $V_{dd}$ or as a charge tank permanently charged by the input supply voltage $V_{dd}$. This in fact has a certain benefit with regard to the performance of the charge pump device. However, it also has a drawback, the disabled stages are used only as a decoupling element or a "charge tank" in front of the pumping stages and therefore only play a passive role.

According to the preferred embodiment shown in FIG. 2b use is made of these disabled stages and in fact results in an increase of the current capability of a charge pump device 1. To put it simply, the preferred embodiment introduces a means of more effectively using the "disabled" stages.

As an example the following describes a way of reinforcing the first active pumping stage A shown in FIG. 2b, in order to achieve the desired output voltage in less time and increase the current provided by the charge pump.

The reinforcement of first pumping stage A is only described with regard to FIGS. 2b and 2c to illustrate the basic principle of effectively "using" the "disabled" stages, e.g. stages $S_1 \ldots S_N$, and may be generalized according to the demands of an actual application.

FIG. 2a illustrates the situation in which a first stage is forced to ground voltage by the bottom plate driver.

The preferred embodiment 1b is illustrated in FIG. 2b. A logic device is giving the bottom plate driver a command to switch the first stage $1^{st}$ between $V_{dd}$ (activated) and ground (disabled) in the same way as for the first active pumping stage A. The first active pumping stage A in FIG. 2b is in fact the second stage or a higher stage $S_{N+1}$ located in the cascade at most. The circuit 1b of FIG. 2b is equivalent to 1c in FIG. 2c, from which it is immediately clear that the input stage A=A' now has a capacitance of $2*C_{stage}$ and the equivalent resistance of A' is $R_d/2$ because the two bottom plate drivers are connected in parallel. Consequently, the charge stored in the second stage A=A' at the end of the charge transfer is higher than in a conventional charge pump device circuit as shown in FIG. 2a.

The attached graphs Ga and Gb in FIGS. 2a and 2b correspond to circuits 1a and 1b in FIG. 2a and FIG. 2b respectively. From the graphs it is clear that in the second stage A the charge transferred into the capacitor will be passed forward to stage B in the preferred embodiment 1b of FIG. 2b is $Q=I_{load}/3f$ instead of $Q=I_{load}/4f$ in a conventional circuit 1a of FIG. 2a.

It should of course be understood that if two stages of the kind indicated by $1^{st}$ in FIG. 2b are available and can be disabled and assuming that both were added to the first active stage A as outlined above, then the charge to be transferred in one cycle would be $Q=3I_{load}/8f$. Any number of available stages, which can be disabled, can be added to the first active stage A according to the preferred embodiment.

Clearly, when the output capacity $C_{buffer}$ of the charge pump is heavily loaded, the present embodiment helps to alleviate the effort. The improvement has been examined in several experiments. In particular, the effect of the improvement has been simulated with a charge pump device with five stages, i.e. 6 charge pumps, for which the $1^{st}$ stage has merely been used as outlined in FIG. 2b to increase the equivalent capacitance of stage two or a higher stage in the cascade. The result of the simulation proved that a preferred embodiment 1b is able to achieve the same voltage within seven clock cycles, as compared to eight clock cycles needed by a conventional device 1a of FIG. 2a. One cycle less is needed by a preferred embodiment. If one considers the load current $I_{load}$ required in order to achieve the same voltage with the prior art approach of FIG. 1 and the outlined approach of the preferred embodiment of FIGS. 2b and 2c of merely improving the first stage in the cascade, the improvement amounts to 12.5% in the current capability. Consequently the prior art charge pump would give 12.5% less current for the same voltage. In other words, a conventional device would take 12.5% more time to recover from a large peak of current absorbed by the load.

This improvement is even more effective considering the fact that the above example has been outlined without taking any load current and any losses for achieving $(N_{stages}+1)*V_{dd}$ into consideration. However, as there is usually a load current in charging, the voltage generally achieved is lower. To obtain a voltage under load conditions, usually the pump has to be over-dimensioned by an increased number of stages in the cascade. Therefore, the input voltage range usually has to be larger than in theory. In order to achieve the target output voltage $V_{out}$ most efficiently the number of active stages can be programmed to address a variety of applications. If there is a sufficient input voltage $V_{dd}$, one or two stages may be disabled by software. By operating those stages in such a way that they increase the value of the first capacitor one is also able to benefit from the increased current capability. In fact, this is achieved without any area being wasted, as the proposed concept may more or less be achieved by merely changing the decoder logic for the bottom plate drivers. Such a decoder is of low voltage and small compared to other devices. Usually the decoder comprises only several logic gates.

To realize the proposed scheme changes have to be made only for some few items of a charge pump device 1. The logic which controls the bottom plate drivers of the stages $S_1 \ldots S_N, S_{N+1} \ldots S_{max}$ in the cascade has to be modified as proposed with the preferred embodiment of FIG. 2b. As a consequence of the proposed charge pump device the voltage on the second pumping stage capacitor A in the preferred embodiment differs from the one of a conventional device as outlined in FIGS. 2a and 2b. In fact, under the outlined conditions of load $V_{dd}$ and target voltage $V_{out}$, the proposed concept is the only one to obtain a current efficiency increase in the amount shown above.

In summary, the proposed concept allows to realize a re-configurable charge pump software architecture. The benefit of this is the increase of the current capability should the wanted multiplication factor be lower than ($N_{stages}+1$).

The field of application of an improved charge pump may be any driver for a grayscale or a color display. As outlined in FIG. 3 such a display 11 may be any display for a LCD or PolyLED technology or any other application needing a voltage booster working under current loads of 0.1 mA to 10 mA. The preferred embodiment of a driving circuit 12 may be part of a display module 11, built with an LCD cell 14 and additionally a display driver IC 12 as proposed. The IC 12 is preferably mounted on glass. Also such a display driver IC could be connected (15, 15a) with TCP or a foil. A charge pump 12a, as a preferred voltage converter embodiment, is part of the illustrated driver IC 12 of FIG. 3, as a preferred driving circuit embodiment. The charge pump provides the high voltage necessary to drive the LCD cell 14. The display module may be built, for example, in small portable devices 10 as cellular phones and Personal Digital Assistants (PDAs) as shown in FIG. 3.

The invention claimed is:

1. A voltage converter for converting an input voltage to an output voltage comprising a plurality of cascaded voltage multipliers and control circuitry for controlling the plurality of voltage multipliers, wherein the control circuitry comprises a switching means for activating at least one first voltage multiplier selected from the plurality of voltage multipliers and for switching at least one further voltage multiplier located in the cascade before the first voltage multiplier in the same way as the first voltage multiplier.

2. A voltage converter according to claim 1, wherein that switching comprises activating and/or disabling.

3. A voltage converter according to claim 1, wherein the first voltage multiplier is one of a number of activated voltage multipliers also located in the cascade at a second or higher order stage located in a sequence of stages at the end of the cascade.

4. A voltage converter according to claim 1, wherein the further voltage multiplier is one of a number of further voltage multipliers located at the first or higher order stages of the cascade located in a sequence of stages at the beginning of the cascade.

5. A voltage converter according to claim 1, wherein at least one of the plurality of voltage multipliers is formed by a charge pump.

6. A voltage converter according to claim 1, wherein the charge pump comprises a charge storage element, a switch and a driver.

7. A voltage converter according to claim 1, wherein one or more of the voltage multipliers have at least one clock input.

8. A voltage converter as claimed in claim 7, wherein the control circuitry is connected to the clock input for supplying a clock signal to the voltage multiplier for controlling the voltage multiplier.

9. A voltage converter according to claim 1, wherein the switching means is a programmable logic device.

10. A voltage converter as claimed in claim 9, further comprising a programming means for operating the switching means as a function of the output and/or the input voltage.

11. A voltage converter as claimed in claim 9, wherein the programming means comprises a software code section capable of activating a number of one or more first voltage multipliers in case of insufficient input voltage.

12. A voltage converter as claimed in claim 9, wherein the programming means comprises a software code section for disabling a number of voltage multipliers selected from the plurality of voltage multipliers in case of sufficient input voltage.

13. A voltage converter as claimed in claim 9, wherein the programming means comprises a software code section capable of selecting a number of one or more further voltage multipliers from the disabled voltage multipliers for switching the further voltage multipliers in the same way as the activated first voltage multiplier.

14. A driving circuit, comprising a voltage converter as claimed in claim 1.

15. A driving circuit as claimed in claim 14, working under a current load of 0.1 mA to 10 mA.

16. A method of converting an input voltage to an output voltage by means of a voltage converter comprising a plurality of cascaded voltage multipliers, wherein at least one first voltage multiplier selected from the plurality of voltage multipliers is activated and at least one further voltage multiplier located in the cascade before the first voltage multiplier is switched in the same way as the first voltage.

17. A voltage converter for converting an input voltage to an output voltage, comprising:
   a plurality of cascaded voltage multipliers and control circuitry adapted to control the plurality of voltage multipliers, the control circuitry further comprising:
   a bottom plate driver adapted to activate at least one first voltage multiplier selected from the plurality of voltage multipliers and to switch at least one further voltage multiplier located in the cascade before the first voltage multiplier in the same way as the first voltage multiplier.

18. A voltage converter as claimed in claim 17, wherein a logic device commands the bottom plate driver to switch the at least one further voltage multiplier.

* * * * *